United States Patent Office

3,705,132
Patented Dec. 5, 1972

3,705,132
MOISTURE-CURED COATING COMPOSITIONS
Michael Cuscurida, Austin, Tex., assignor to Jefferson Chemical Company, Inc., Houston, Tex.
No Drawing. Filed Mar. 22, 1971, Ser. No. 127,046
Int. Cl. C08g 22/10, 22/14, 22/24
U.S. Cl. 260—75 NP                2 Claims

ABSTRACT OF THE DISCLOSURE

A polyurethane coating which dries very rapidly and cures quickly may be made by reacting a polyether triol and a polyester diol with an aliphatic polyisocyanate. Moisture cured polyurethane coatings are widely used in seamless flooring.

BACKGROUND OF THE INVENTION

Field of the invention

This invention pertains to the field of polyurethane coatings.

Description of the prior art

Moisture cured polyurethane coatings are finding acceptance in various areas including the preparation of seamless flooring. The coatings of major interest are moisture cured. For example, U.S. Pat. 3,396,210 teaches a moisture cured coating which is a combination of polyhydric polyethers or polyhydric polyesters with an aliphatic or aromatic isocyanate in the presence of a polyunsaturated ester which is reactive. Also, U.S. Pat. 3,406,134 reveals a moisture cured coating composition consisting of a polyester prepared from an alkylene glycol and an unsaturated aromatic dibasic acid, a polyhydric alcohol and an isocyanate.

The polyurethane coating compositions of the present invention use a combination of a polyester diol prepared from a saturated dibasic acid and an alkylene glycol, and a polyether triol which is the reaction product of an alkylene oxide and a polyhydric alcohol. This combination of polyester diol and polyether triol is reacted with an aliphatic isocyanate and the resultant mixture is moisture cured. This particular combination of ingredients gives a coating which will cure quickly and resist yellowing.

SUMMARY OF THE INVENTION

The invention is a polyurethane moisture cured coating composition which comprises a polyester diol prepared from a saturated dibasic acid and an alkyene glycol; a polyether triol which is the reaction product of an alkylene oxide and a polyhydric alcohol; and an aliphatic isocyanate. The invention is also the process for making the coating composition.

DESCRIPTION OF THE PREFERRED EMBODIMENTS

The polyester diol useful in the moisture cured coatings of my invention are prepared by reacting alkylene or polyoxyalkylene glycols such as ethylene glycol, diethylene glycol, propylene glycol, dipropylene glycol, butylene glycol, etc., with adipic acid. The ratio of gycol and adipic acid are such that the resulting linear polyester has a hydroxyl functionality of about 2 and a hydroxy number of from about 40 to about 120 and preferably from about 50 to about 60. Small amounts of other difunctional hydroxy materials such as phenoxyethanol-formaldehyde and phenoxypropanol-formaldehyde condensates may be used in preparing the polyesters useful in my invention but are not essential.

The polyether triols useful in my invention are alkylene oxide adducts of tri-functional alcohols such as glycerine, trimethylolpropane, and hexanetriol. For example, propylene oxide adducts of glycerine or trimethylolpropane are especially preferred. The polyether polyols may range in hydroxyl number from about 500 to 650. The polyether may be used in conjunction with trifunctional alcohols such as trimethylopropane and glycerine.

The mol ratio of polyether to polyester useful in the moisture cured coatings of my invention may range from about 70/30 to about 80/20.

The isocyanates useful in my invention are aliphatic diisocyanates such as methylene bis(cyclohexyl isocyanate), 4,4'-isopropylidene bis(cyclohexyl isocyanate), hexamethylene diisocyanate, xylylene diisocyanate, methylcyclohexylene diisocyanate, lysine diisocyanate methyl ester, isophorone diisocyanate, and trimethylhexamethylene diisocyanate. It is necessary to react an excess of isocyanate with the polyester diol and polyether triol. The excess isocyanate group react with moisture in the air after application, thus completing the cure and forming the coating of the invention. The isocyanate to hydroxyl equivalent ratio should be controlled within the limits of 1.75–2.25.

Although coatings may be prepared without using catalysts, it is sometimes desirable to use either a tertiary amine or an organic metal salt in the formulation to catalyze the reaction between the free isocyanate groups and the moisture in the air.

Many useful catalyst materials for the urethane reaction are well known and may be employed in the practice of the invention. Examples of suitable tertiary amines, used either individually or in mixture, are the N-alkylmorpholines, N-alkylalkanolamines, N-N-dialkylcyclohexylamines and alkylamines where the alkyl groups are methyl, ethyl, propyl, butyl, etc. Also triethylenediamine, tetramethylethylenediamine, triethylamine, tripropylamine, tributylamine, triamylamine, pyridine, quinoline, dimethylpiperazine, dimethylhexylhexahydroaniline, piperazine, N-ethylmorpholine, 2-methylpiperazine, dimethylaniline and nicotine, for example, are useful urethane catalysts. Also, useful catalysts are organo-metallic compounds including those of bismuth, lead, tin, titanium, iron, antimony, uranium, cadmium, cobalt, thorium, aluminum, mercury, zinc, nickel, serium, molybdenum, vanadium, copper, manganese, zirconium, etc. Some examples of these metal catalysts included bismuth nitrate, lead 2-ethylhexoate, lead benzoate, lead oleate, tributyltin, butyltin trichloride, stannic chloride, stannous octoate, stannous oleate, ferric chloride, antimony trichloride, antimony glycolate, tin glycolates, etc. Selection of the individual catalysts and proportions to use in the polyurethane reaction are well within the knowledge of those skilled in the art, and an amine and organo metallic compound are often used together in the polyurethane reaction.

A solvent must also be used in the coating before it is applied to aid in application, viscosity adjustment or storage stability. The solvent should be inert to the polyurethane reactions. Examples of suitable solvents are xylene, 2-ethoxyethylacetate, ethyl benzene, toluene, mineral spirits, ethyl acetate, cyclohexanone, methyl ethyl ketone, and amyl acetate.

My invention may be illustrated by the following examples which also illustrate the improvement of my invention over prior art coating formulations.

EXAMPLE 1

This example will illustrate the use of a formulation of the invention, Formulation A, consisting of a polyether triol (three mole propylene oxide adduct of trimethylolpropane) and a 54.1 hydroxyl number polyester diol prepared from the following reactants: (adipic acid one mole, diethylene glycol 1.14 moles, phenoxyethanol-formaldehyde condensate 0.024 mole) and methylenebis(cyclohexyl isocyanate). It will further show that film prepared from such a formulation cure much faster and have improved properties over a formulation of the prior art, formulation B, derived from a blend of the three mole propylene oxide adduct of trimethylolpropane and a 2000 molecular weight polypropylene glycol and methylenebis-(cyclohexyl isocyanate). This formulation represents a typical example of prior art. The following general procedure was used to prepare the above type coatings.

All of the reactants except the isocyanate and the dibutyltin dilaurate were charged into a 500 ml. three-necked flask equipped with a thermometer, stirrer, Dean-Stark trap and condenser, and an inlet and outlet tube for nitrogen. Maintaining a nitrogen purge, the reactants were heated to 125–135° C. and the ethyl acetate—water azeotrope removed. The mixture was then cooled to 25.30° C. and the dibutyltin dilaurate and isocyanate added. The reaction exotherm peaked at 36° C. It was then heated at 50° C. for two hours. The final product analyzed 3.48% free isocyanate. Formulations and film properties are summarized in the following table:

|  | Formulation A | Formulation B |
|---|---|---|
| Formulation, p.p.w.: |  |  |
| Three mole propylene oxide adduct of trimethylolpropane | 22.15 | 22.15 |
| Trimethylolpropane | 1.67 | 1.67 |
| Polyester [1] | 62.5 |  |
| 2,000 molecular weight polypropylene glycol |  | 6.25 |
| Di-t-butyl-p-cresol | 0.16 | 0.16 |
| Dibutyltin dilaurate | 0.16 | 0.16 |
| Methylenebis(cyclohexyl isocyanate) | 84.7 | 86.5 |
| Xylene | 117 | 117 |
| Ethylene glyco monoethyl ether acetate | 117 | 117 |
| Ethyl acetate | 20 | 20 |
| Film properties: |  |  |
| Tack-free (Atlas), 3 mil, hr | 1 | 4–5 |
| Sward hardness (hr.) | 12(2) / 28(6) / 36(24) / 44(72) | 4 (6) / 32(24) / 34(48) / 36(72) |
| Impact resistance, in. lb.: |  |  |
| Forward | [2] 160 | [2] 160 |
| Reverse | [2] 160 | [2] 160 |
| Tensile, p.s.i. | 5,360 | 4,420 |
| 100% modulus, p.s.i. | 4,200 | 4,100 |
| Elongation, percent | 135 | 110 |
| Taber wear factor, CS-17, 1,000 g., 1,000 cycles, mgm. loss | 19.2 | 17.3 |

[1] Hydroxyl No. 54.1, prepared by reaction of adipic acid (one mole) diethylene glycol (1.14 moles), phenoxyethanol-formaldehyde condensate (0.024 mole).
[2] Pass.

EXAMPLE 2

This example will illustrate the use of a formulation of the invention, formulation C, consisting of a polyether triol (three mole propylene oxide adduct of trimethylolpropane) and a 52.1 hydroxyl number linear polyester prepared from the following reactants: adipic acid (one mole), diethylene glycol (1.15 moles) and 4,4'-isopropylidenebis(cyclohexyl isocyanate). The example will further show that films prepared from such a formulation cure much faster and have improved properties over a formulation of the prior art, formulation D, derived from a blend of the three mole propylene oxide adduct of trimethylolpropane and a 2000 molecular weight polypropylene glycol and 4,4' - isopropylidenebis(cyclohexyl isocyanate). The procedure of Example 1 was used to prepare the coatings.

Formulations and film properties are summarized in the following table.

|  | Formulation C | Formulation D |
|---|---|---|
| Formulation, p.b.w.: |  |  |
| Three mole propylene oxide adduct of trimethylolpropane | 23.2 | 23.2 |
| Linear polyester [1] | 50 |  |
| 2,000 molecular weight polypropylene glycol |  | 50 |
| Di-t-butyl p-cresol | 0.16 | 0.15 |
| Dibutyltin dilaurate | 0.48 | 0.15 |
| 4,4'-Isopropylidenebis(cyclohexyl isocyanate) | 80 | 75.4 |
| Xylene | 104 | 104 |
| Ethylene glycol monoethyl ether acetate | 104 | 104 |
| Ethyl acetate | 20 | 20 |
| Film properties: |  |  |
| Tack-free (Atlas), 3 mil, hr | 1 | 1½ |
| Sward hardness (hr.) | 30 (2) / 37 (5) / 40 (24) | 14 (3) / 32 (20) / 32 (24) / 35 (48) |
| Tensile, p.s.i. | 4,770 | 3,910 |
| 100% modulus, p.s.i. | 3,990 | 3,520 |
| Elongation, percent | 130 | 130 |
| Taber wear factor, CS-17, 1,000 g., 1,000 cycles, mgm. loss | 32 | 32.9 |

[1] Hydroxyl No. 52.1, prepared by reaction of adipic acid (one mole) and diethylene glycol (1.15 moles).

I claim:
1. A polyurethane moisture cured coating composition which comprises:
 a polyester diol having a hydroxyl number of from about 40 to about 120 prepared from a saturated dibasic acid and an alkylene glycol,
 a polyether triol having a hydroxyl number from about 500 to about 650, and
 an aliphatic isocyanate in such proportions that the ratio of isocyanate groups to the total hydroxyl groups of the polyester diol and polyether triol lies in the range of 1.75–2.25, and wherein the mole ratio of polyether triol to polyester diol range from 70/30 to 80/20.

2. A polyurethane moisture cured coating composition as in claim 1 wherein the polyester diol has a hydroxyl number of about 52 and is prepared by reacting adipic acid and diethylene glycol in a molar ratio of 1:1.15; and wherein the polyether triol is a three mole propylene oxide adduct of trimethylol propane.

References Cited

UNITED STATES PATENTS

| 3,428,609 | 2/1969 | Chilvers et al. | 260—75 |
| 3,436,361 | 4/1969 | Wooster | 260—18 |
| 3,373,143 | 3/1968 | Chilvers et al. | 260—75 |
| 3,425,973 | 2/1969 | Shaw | 260—18 |
| 3,203,931 | 8/1965 | Swart | 260—77.5 AT |
| 3,661,862 | 5/1972 | Bonin et al. | 260—77.5 AP |
| 3,663,514 | 5/1972 | Campbell et al. | 260—77.5 AT |

FOREIGN PATENTS

| 6803299 | 9/1968 | Netherlands | 260—77.5 AP |

DONALD E. CZAJA, Primary Examiner

H. S. COCKERAM, Assistant Examiner

U.S. Cl. X.R.

260—77.5 AM, 77.5 AB, 77.5 AC, 77.5 AN

UNITED STATES PATENT OFFICE

CERTIFICATE OF CORRECTION

Patent No. 3,705,132　　　　　　　　　Dated December 5, 1972

Michael Cuscurida
Assignor to Jefferson Chemical Company, Inc.
Houston, Texas, a corporation of Delaware It is certified that errors appear in the above-identified patent and that Letters Patent are hereby corrected as shown below:

In column 2, line 7, "trimethylopropane" should read -- trimethylolpropane --; column 2, line 19, "group" should read -- groups --. In column 3, line 4, "film" should read -- films --; column 3, line 30, "p.p.w." should read -- p.b.w. --; column 3, line 33, "6.25" should read -- 62.5 --; column 3, line 36, "glyco" should read -- glycol --. In column 4, line 38, "range" should read -- ranges --.

Signed and sealed this 3rd day of April 1973.

(SEAL)
Attest:

EDWARD M. FLETCHER, JR.　　　　　　　　ROBERT GOTTSCHALK
Attesting Officer　　　　　　　　　　　Commissioner of Patents